(12) United States Patent
Moon et al.

(10) Patent No.: US 10,271,673 B2
(45) Date of Patent: Apr. 30, 2019

(54) DETACHABLE JUICE EXTRACTING SCREW ASSEMBLY AND JUICER COMPRISING SAME

(71) Applicant: COWAY CO., LTD., Chungcheongnam-do (KR)

(72) Inventors: Sung Il Moon, Seoul (KR); Man Uk Park, Seoul (KR); Seong Wook Kim, Seoul (KR)

(73) Assignee: COWAY CO., LTD., Chungcheongnam-Do (KR)

( * ) Notice: Subject to any disclaimer, the term of this patent is extended or adjusted under 35 U.S.C. 154(b) by 455 days.

(21) Appl. No.: 14/914,746

(22) PCT Filed: Aug. 28, 2014

(86) PCT No.: PCT/KR2014/008001
§ 371 (c)(1),
(2) Date: Feb. 26, 2016

(87) PCT Pub. No.: WO2015/034207
PCT Pub. Date: Mar. 12, 2015

(65) Prior Publication Data
US 2016/0213188 A1    Jul. 28, 2016

(30) Foreign Application Priority Data

Sep. 5, 2013 (KR) .................. 10-2013-0106621
Aug. 5, 2014 (KR) .................. 10-2014-0100381

(51) Int. Cl.
*A47J 19/02*    (2006.01)
*A47J 19/06*    (2006.01)

(52) U.S. Cl.
CPC ............... *A47J 19/02* (2013.01); *A47J 19/06* (2013.01)

(58) Field of Classification Search
CPC ...... A47J 43/042; A47J 19/025; A47J 19/027; A47J 43/046; A47J 19/02; A47J 19/06
(Continued)

(56) References Cited

U.S. PATENT DOCUMENTS 9,392,909 B2 * 7/2016 Kim ................. A47J 19/027
2013/0081547 A1   4/2013 Hu
2013/0125768 A1   5/2013 Shi et al.

FOREIGN PATENT DOCUMENTS

CN     203106743 U     8/2013
CN     203138083 U     8/2013
(Continued)

OTHER PUBLICATIONS

Translation of CN203106743.*
Japan Patent Office, Office Action, dated Nov. 13, 2018. (In Japanese).

*Primary Examiner* — Dana Ross
*Assistant Examiner* — Joseph W Iskra
(74) *Attorney, Agent, or Firm* — McNees Wallace & Nurick LLC

(57) ABSTRACT

The present invention provides a juice extracting screw assembly and a juicer comprising the same which allows the selection between a mesh net and solid net, thereby making it possible to conveniently change the operation modes, satisfying any of the user's preferences in the cases of whether both the juice and residue are needed together or needed separately, and further by having a screw assembly capable of being separated into a top and a base, it allows convenient cleaning for users.

12 Claims, 8 Drawing Sheets

(58) Field of Classification Search
USPC .......... 99/503, 510, 511, 513; 100/117, 112, 100/126, 127, 131, 133, 134; 241/24, 26, 241/166, 167; 366/205
See application file for complete search history.

(56) References Cited

FOREIGN PATENT DOCUMENTS

| | | | |
|---|---|---|---|
| JP | 2013154012 A | | 8/2013 |
| KR | 10-1013504 B1 | | 2/2011 |
| KR | 10-1099429 B1 | | 12/2011 |
| KR | 101099429 | * | 12/2011 |
| KR | 10-2012-0042606 A | | 5/2012 |
| WO | 2012057483 A2 | | 5/2012 |
| WO | 2012057484 A2 | | 5/2012 |

* cited by examiner

[Fig. 1]
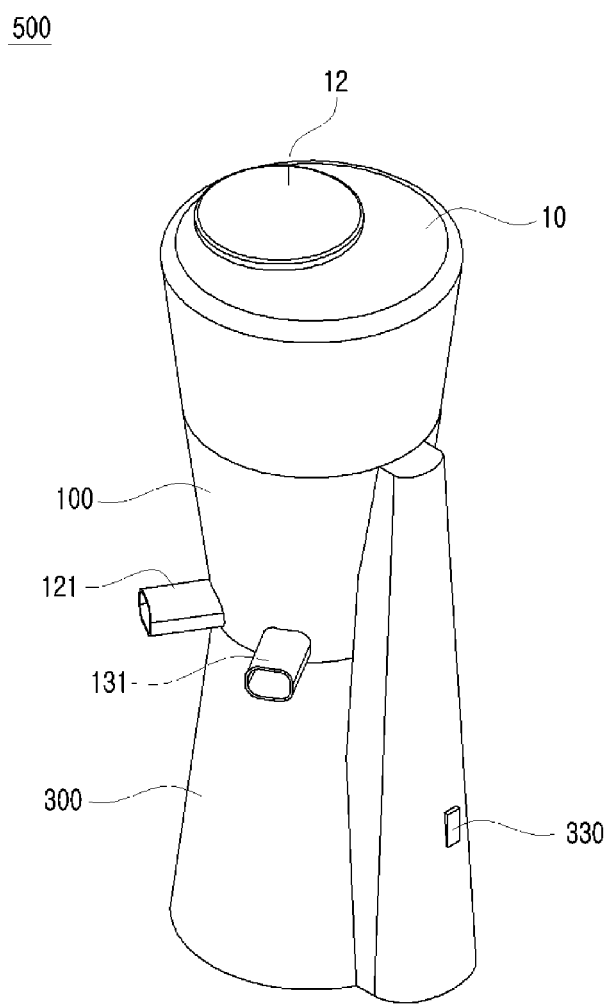

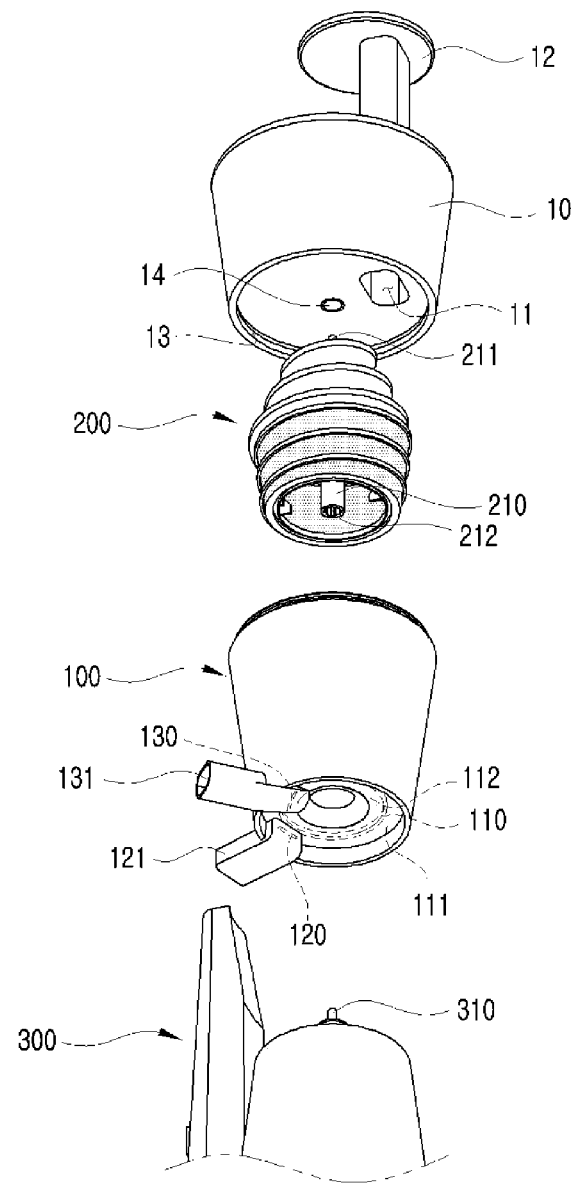
[Fig. 2]

[Fig. 3]
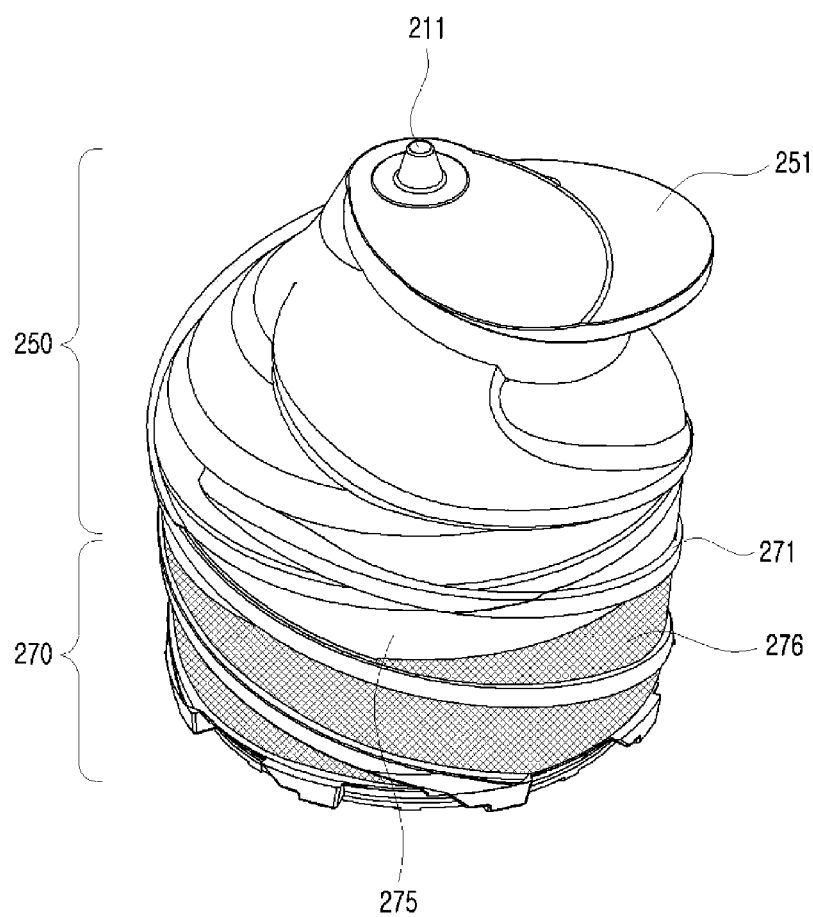

[Fig. 4a]
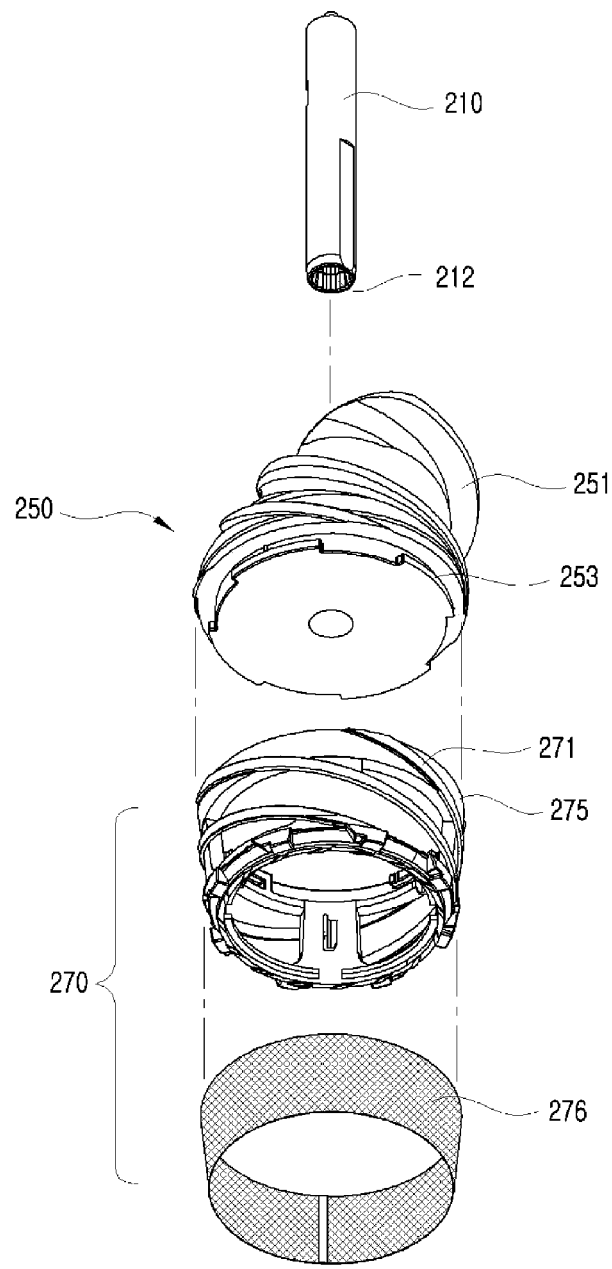

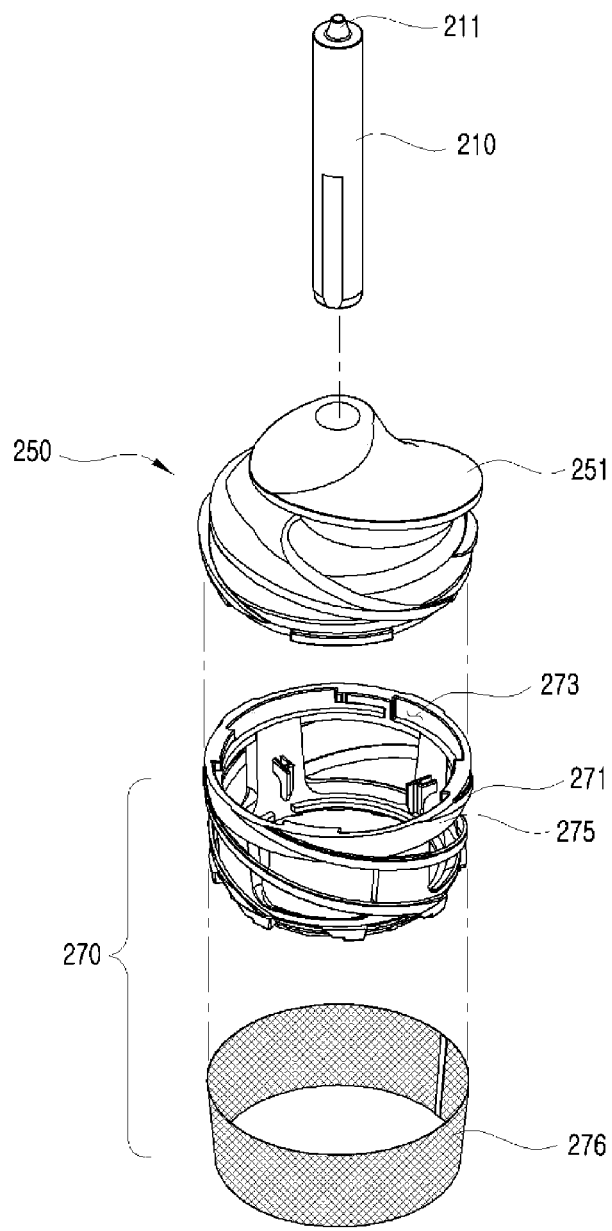
[Fig. 4b]

[Fig. 4c]
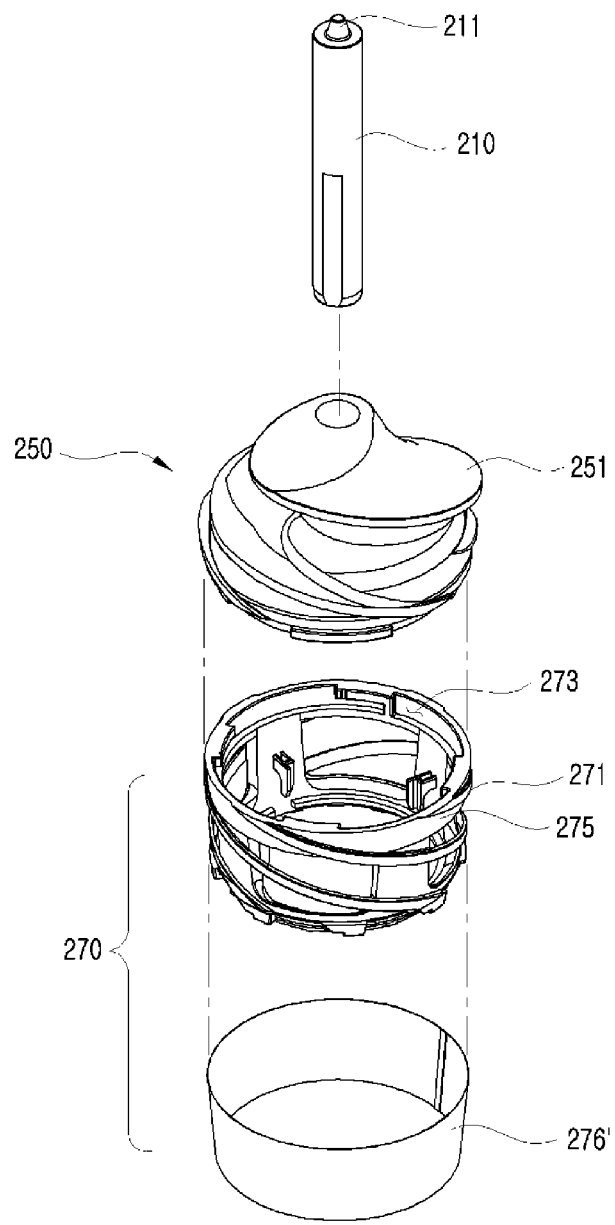

[Fig. 5]
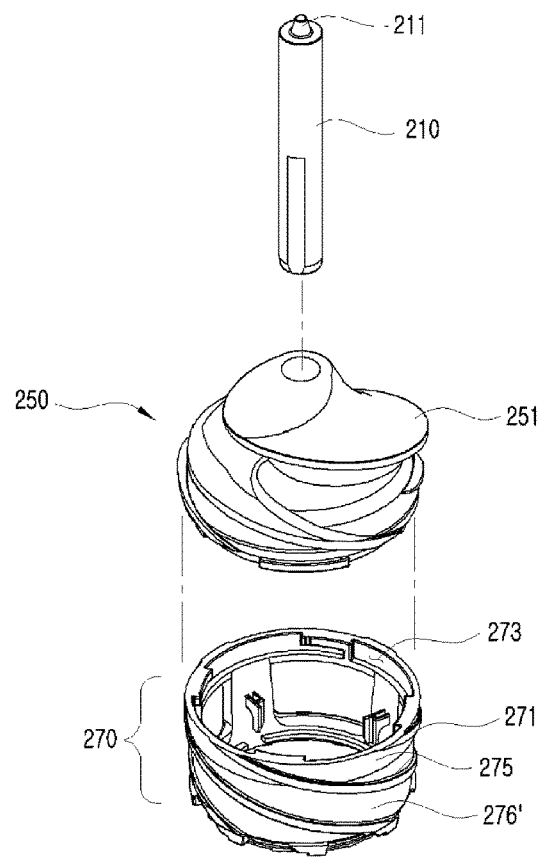
[Fig. 6]
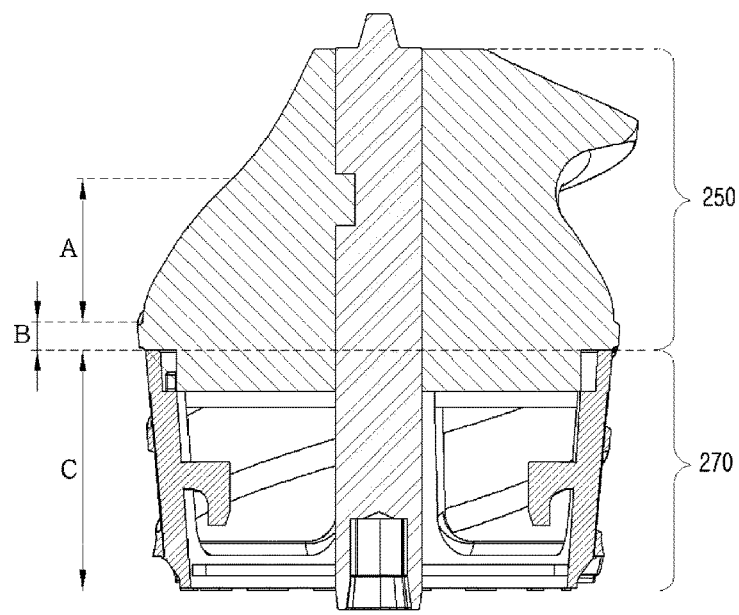

[Fig. 7]
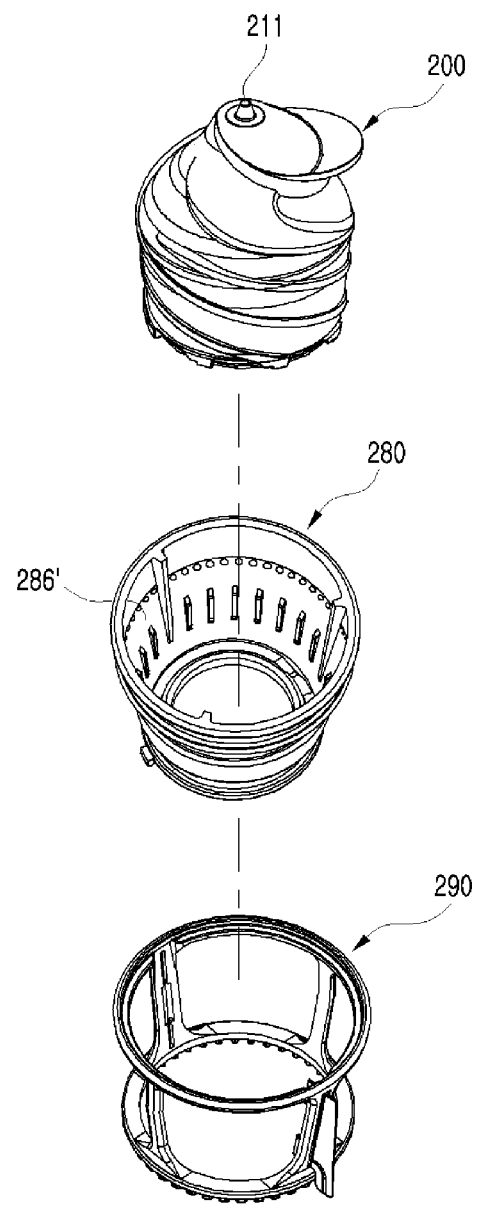

US 10,271,673 B2

DETACHABLE JUICE EXTRACTING SCREW ASSEMBLY AND JUICER COMPRISING SAME

TECHNICAL FIELD

The present invention relates to a detachable juice extracting screw assembly and a juicer comprising the same, more particularly, to a juice extracting screw assembly and a juicer comprising the same having a screw assembly capable of being separated into a top and a base, thereby allowing convenient cleaning by users and various operation modes.

BACKGROUND ART

A conventional vertical-type centrifugal juicer, for example, Korean Registered Patent No. 1013504, includes a screw structure through which the object fed for juice extraction such as fruits or vegetables is cut, transferred, crushed, and squeezed. The screw structure is provided inside a drum, and includes a juice extracting net by which juice is extracted during the process where the object for juice extraction passes through between the juice extraction net and the drum due to the rotation of the screw assembly. The extracted juice desirable for consumption is discharged separately from residue through respective outlets after being gathered separately at the base of the drum. In some cases, the juice extracting net may not be provided in the screw assembly, and may be provided additionally in between the drum and the screw assembly.

However, in the conventional juicer screw, the juice extracting net is included in the screw assembly, or provided between the drum and the screw assembly. Subsequent to completing the juice extraction, the user wishes to wash the residue stuck in between the drum and juice extracting net, but in order to do so, the screw assembly must be taken out, overturned, and washed by putting a hand inside, which not only makes comprehensive washing difficult, but also makes the task cumbersome.

Furthermore, a variety of preferences may exist based on whether the user requires only extracted juice as is with the conventional juicer, or also requires residue used in smoothies or milkshakes, or in cases where garlic is chopped using a juicer, and the conventional juicer cannot satisfy such various preferences.

DISCLOSURE

Technical Problem

The present invention has been conceived to resolve the aforementioned issues.

In particular, an aspect of the present invention serves to provide a juice extraction assembly and a juicer including the same to eliminate the difficulty in washing a screw assembly provided with a juice extracting net.

Further, an aspect of the present invention serves to provide a juicer in which the operation modes can easily be changed based on the various preferences of the user.

Technical Solution

In order to solve the above-mentioned technical problems, according to an aspect of the present invention, there is provided a juice extracting screw assembly and a juicer comprising the same, including a juice extracting screw assembly, comprising: a hollow drum 100; and a screw assembly 200 disposed inside the hollow drum 100, wherein the screw assembly 200 comprises: an upper assembly part 250 in which an extracting blade 251 is provided externally in a form of a screw; and a lower assembly part 270 capable of being assembled on and dissembled from the upper part 250 of the juice extracting screw assembly.

According to one embodiment, a juice extracting rib 271 is provided on an outer surface of the lower assembly part 270 and, when the upper assembly part 250 and the lower assembly part 270 are installed, the juice extracting blade 251 and the juice extracting rib 271 are connected in series.

According to one embodiment, when an object for juice extraction is fed to the juice extracting screw assembly while the upper assembly part 250 and the lower assembly part 270 are installed, the object for juice extraction is separated into an extracted juice and a residue by rotation of the screw assembly 200, and flows downwards along the juice extracting blade 251 and the juice extracting rib 271 that are consecutively connected.

According to one embodiment, the lower assembly part 270 comprises a lower body 275 having a plurality of openings, and a mesh net 276 capable of being attached to and detached from the lower body 275.

According to one embodiment, the mesh net 276 is replaceable by a solid net 276'.

According to one embodiment, the mesh net 276 is disposed in the lower assembly part 270, and the lower assembly part 270 and the mesh net 276 are integrally manufactured.

According to one embodiment, the solid net 276' is disposed in the lower assembly part 270, and the lower assembly part 270 and the solid net 276' are integrally manufactured.

According to one embodiment, when the upper assembly part 250 and the lower assembly part 270 are installed and an object for juice extraction is fed to the juice extracting screw assembly with the mesh net 276 being provided, the object for juice extraction is separated into an extracted juice and a residue by rotation of the screw assembly 200, and the juice passes through the mesh net 276 to flow inwardly to the screw assembly 200 while the residue fails to pass through the mesh net 276 and flows outwardly to the screw assembly 200.

According to one embodiment, when the upper assembly part 250 and the lower assembly part 270 are installed and an object for juice extraction is fed to the juice extracting screw assembly with the solid net 276' being provided, the object for juice extraction is separated into an extracted juice and a residue by rotation of the screw assembly 200, and the juice and the residue fail to pass through the solid net 276' and flow outwardly to the screw assembly 200.

According to one embodiment, the upper assembly part 250 comprises: a first portion A having a circular conical shape and a second portion B having an inverted circular conical shape.

According to one embodiment, the lower assembly part 270 is an inverted circular cone and is connected in series, thereby continuing from the second portion B.

According to one embodiment, a plurality of protrusions 253 are provided on a lower part of the upper assembly part 250, and a plurality of connecting grooves 273 to be joined with the plurality of protrusions 253 by insertion are provided in an upper part of the lower assembly part 270.

According to one embodiment, a lower part of the plurality of connecting grooves 273 is provided in an L shape through being extended towards a rotating direction of the screw assembly 200.

According to another aspect of the present invention, there is provided a juicer, comprising: a juice extracting screw assembly as set forth in any one of the mentioned embodiments; a main body 300 provided with a rotary member to provide a rotating force to the screw assembly 200; and a lid 10 to close the hollow drum 100 at the upper part therein, to which an object for juice extraction is to be fed.

According to one embodiment, the juicer operates selectively from among a first mode in which the lower assembly part 270 comprises a plurality of holes and a second mode in which the lower assembly part 270 does not comprise a plurality of holes.

Advantageous Effects

As described above, the present invention is advantageous in that the screw assembly can be easily disassembled to allow convenient washing by the user.

Further, the present invention is advantageous in that the user may readily change the operation mode by selecting from a mesh net or a solid net, so that any of the user's preferences, such as cases where extracted juice is required either along with or separate from residue, may be satisfied.

DESCRIPTION OF DRAWINGS

FIG. 1 is a perspective view illustrating a juice extracting screw assembly and a juicer including the same according to a first embodiment and a second embodiment of the present invention;

FIG. 2 is an exploded perspective view illustrating a juice extracting screw assembly and a juicer including the same according to a first embodiment and a second embodiment of the present invention;

FIG. 3 is a perspective view illustrating a juice extracting screw assembly according to a first embodiment and a second embodiment of the present invention;

FIGS. 4a through 4c are exploded perspective views illustrating a juice extracting screw assembly according to a first embodiment of the present invention;

FIG. 5 is an exploded perspective view illustrating a juice extracting screw assembly according to a second embodiment of the present invention;

FIG. 6 is a cross-sectional view illustrating a juice extracting screw assembly according to a first embodiment and a second embodiment of the present invention; and FIG. 7 is an exploded perspective view illustrating a juice extracting screw assembly according to a third embodiment of the present invention.

MODE FOR INVENTION

A juicer including a juice extracting screw assembly according to an embodiment of the present invention will be described. Although a few embodiments of the present invention have been shown and described, the present invention is not limited to the described embodiments. Therefore, it would be appreciated by those skilled in the art that changes may be made to these embodiments and the same principle of the juice extracting screw assembly may be applied to other apparatuses aside from the juicer herein without departing from the principles and spirit of the invention, the scope of which is defined by the claims and their equivalents.

Elements comprising the present invention may be used integrally or separately as necessary. Also, the elements may be partially omitted based on a form of use.

Hereinafter, the term "solid net" will be distinguished from the term "mesh net" in that "mesh net" refers to a net which allows extracted juice to pass through but not the residue when an object for juice extraction is separated into extracted juice and residue, whereas "solid net" refers to a net such as a plate that does not allow passage of both the extracted juice and residue.

Reference will now be made in detail to embodiments of the present invention, examples of which are illustrated in the accompanying drawings, wherein like reference numerals refer to the like elements throughout. The embodiments are described below in order to explain the present invention by referring to the figures. Here, it should be understood that the thicknesses of lines and sizes of the elements shown in the drawings may be exaggerated when drawn to conveniently provide a clear description of the structure of the present invention. Further, the technical terms used in the description are defined in light of the functions of elements of the present invention and, accordingly, it should be understood that the technical terms may be changed according to intentions of users and workers and according to custom. Therefore, it is required that the definition of the technical terms be determined based on the contents of the present invention extending throughout the entire description.

1. Description of Overall Configuration of Juicer 500 According to the First and Second Embodiment Hereinafter, the juicer 500 according to an embodiment of the present invention will be described with reference to the accompanying drawings.

Referring to FIGS. 1 and 2, the overall configuration of the juicer 500 according to the first and second embodiment will be described.

The juicer 500 includes a lid 10, a drum 100 to be fastened to the lid 10, a rotatable screw assembly 200 installed in the drum 100, and a main body 300 to be joined with a lower part of the drum 100. Hereinafter, the term "juice extracting screw assembly" will be used as a term encompassing the drum 100 and the screw assembly 200.

The lid 10 is provided with a feed hole 11 spaced at a predetermined distance apart from the center of the lid 10 to allow an object for juice extraction to be fed, a coupling tooth 13 formed along the inner diameter of the bottom surface of the lid 10, a rotating shaft fitting groove 14 formed at a center of the bottom surface, and a pusher 12 in a stick shape to push the object for juice extraction into the feed hole 11. As shown in FIG. 2, the feed hole 11 is disposed at a position eccentric from the center of the lid 10, but it is clear that there is no limit to its specific position whatsoever.

The drum 100 is provided in the form of a hollow cylindrical housing having an internal space, and includes a guide tooth 110 formed to protrude in a circular shape around the center of the bottom inner surface of the drum 100 having a predetermined diameter, a first guide groove 111 formed on the outer side and a second guide groove 112 formed on the inner side in respect to the guide tooth 110, a residue discharge hole 120, a juice discharge hole 130, a residue flow vessel 121, and a juice flow vessel 131.

The first guide groove 111 is formed on the outer side of the guide tooth 110 in a circular shape around the center of the drum 100 having a diameter greater than the guide tooth 110, and therein the residue discharge hole 120 vertically penetrating the bottom surface of the drum 100 is formed.

The second guide groove 112 is formed on the inner side of the guide tooth 110 in a circular shape around the center of the drum 100 having a diameter smaller than the guide tooth 110, and therein the juice discharge hole 130 vertically penetrating the bottom surface of the drum 100 is formed.

The residue flow vessel 121 and the juice flow vessel 131 are respectively in communication with the discharge hole 120 and the juice discharge hole 130 and extend outwardly from the drum 100, such that the residue and juice may be conveniently discharged.

In particular, the object for juice extraction is separated into juice and residue by a rotating force during the process of passing through the screw assembly 200, wherein the juice passes through the mesh net 276, which will be described below, flows downwards inside the screw assembly 200, and then flows along the second guide groove 112 to be discharged outside of the juicer through the juice discharge hole 130 and juice flow vessel 131, whereas the residue fails to pass through the mesh net 276, flows downwards along the outer surface of the screw assembly 200, and then flows along the first guide groove 111 to be discharged outside the juicer through the residue discharge hole 120 and residue flow vessel 121.

Meanwhile, the residue flow vessel 121 may further include an elastic packing member (not shown) that has the function of opening the residue flow vessel 121 subsequent to the accumulation of residue to a predetermined amount, so as to prevent the loss of juice extraction rate due to being discharged all at once at an early stage of extraction.

It is desirable for the upper part of the main body 300 to be formed in a size corresponding to the bottom surface of the drum 100 wherein the main body 300 is inserted and joined at the lower part of the drum 100.

Inside the main body 300, a rotating member such as a motor is included, and a switch 300 to authorize power is placed on the exterior surface of the main body 300.

The rotating member is provided with an angled shaft 310 which is inserted and fastened to an angled shaft hole 212 formed in the rotating shaft 210 disposed at the lower part of the screw assembly 200 to rotate the rotating shaft 210 and the screw assembly 200 surrounding the rotating shaft 210.

2. Description of Juice Extracting Screw Assembly According to First Embodiment and Second Embodiment Hereinafter, the screw assembly 200 according to a first embodiment and a second embodiment of the present invention will be described in detail with reference to FIGS. 3 through 6.

FIGS. 4a and 4b illustrate a first embodiment in which the mesh net 276 is provided in a detachable form, and FIG. 4C illustrates a first embodiment in which a detachable solid net 276' is provided in a detachable form.

FIG. 5 illustrates an example of the solid net 276' in a second embodiment in which a mesh net (not shown) or the solid net 276' is provided in an integrated form.

The screw assembly 200 according to the first and second embodiment is provided in a form in which an upper part and a lower part are freely detachable in a manner dissimilar to the related art, thereby enabling a selection between the mesh net 276 and the solid net 276' as described in the first embodiment or a selection between a lower assembly part 270 attached with the mesh net 276 and a lower assembly part 270 attached with the solid net 276' as described in the second embodiment so as to adjust the juice extraction mode.

The screw assembly 200 includes an upper assembly part 250 and a lower assembly part 270. The upper assembly part 250 and the lower assembly part 270 are detachably fastened.

The rotating shaft 210 is disposed at the center of the screw assembly 200 in a manner where it penetrates the upper assembly part 250 and the lower assembly part 270. As previously described, a rotating force is transferred to the rotating shaft 210 by the rotating member, and the screw assembly 200 is rotated by the rotation of the rotating shaft and extracts the object for juice extraction.

An outer surface of the upper assembly part 250 is provided with an extracting blade 251. The extracting blade 251 is provided in a form of a screw, and when the object for juice extraction is fed to the juice extracting screw assembly, the object for juice extraction is separated into juice and residue after being crushed and squeezed by the extracting blade 251 and the separated juice and residue flow downwards along the screw-type extracting blade 251.

The lower surface of the upper assembly part 250 is provided with a plurality of protrusions 253. The plurality of protrusions 253 has a structure capable of being inserted into a connecting groove 273 provided on the upper surface of the lower assembly part 270 to be discussed later.

The outer surface of the lower assembly part 270 is provided with an extracting rib 271. The extracting rib 271 assists the crushing and squeezing of the object for juice extraction through interaction with the drum 100.

It is preferable for the extracting rib 271 to be formed continuously connected from the extracting blade 251 when the upper assembly part 250 and the lower assembly part 270 are installed. By being connected in continuity, the object for juice extraction, juice, or residue in the upper assembly part 250 may flow downwards smoothly along the extracting blade 251 and the extracting rib 271.

Referring to FIGS. 4a through 4c, the lower assembly part 270 according to the first embodiment will be described in detail. A body of the lower assembly part 270 includes a lower body 275 having a plurality of openings and the mesh net 276 having a plurality of holes.

The body of the lower assembly part 270 includes a lower body 275 having a plurality of openings, and a mesh net 276 having a plurality of holes or a solid net 276'.

The lower body 275 functions as the frame that maintains the shape of the lower assembly part 270. A user may select, at his/her own will, from the mesh net 276 and the solid net 276' to be installed in the lower body 275. I.e., the user may disassemble the upper assembly part 250 from the lower assembly part 270, disassemble the mesh net 276 from the lower assembly part 270, install the solid net 276', and re-assemble the upper assembly part 250 with the lower assembly part 270, or vice versa based on the selection of the user.

The mesh net 276 allows only the juice to pass through the plurality of holes, and not the residue. The juice and the residue separated outside the screw assembly 200 is divided by the boundary of the mesh net 276, thereby flowing separately into the first guide groove 111 and the second guide groove 112.

When the mesh net 276 is installed, the juice flows on the inner side of the screw assembly 200 to be separated from the residue. However, when the solid net 276' is installed, the juice flows outside of the screw assembly 200 along with the residue.

In particular, when a user wishes to separate the juice from the residue, the mesh net 276 is selected to be installed, and when wishing to use both the juice and the residue, the solid net 276' is selected to be installed. When the solid net 276' is selected, the juice and residue are discharged outwardly by passing through the residue flow vessel 121, the juice flow vessel 131, or an additional discharge vessel (not shown) provided for discharging the juice and the residue together.

In other embodiments of the present invention, a net selectable by the user may further include another net having a hole in a size differing from that of the mesh net 276, in addition to the mesh net 276 and the solid net 276'.

Referring to FIG. 5, the lower assembly part 270 according to the second embodiment will be described in detail. A difference from the first embodiment lies in a presence of two lower assembly parts including the lower assembly part 270 integrally installed with the mesh net 276 and the lower assembly part 270 integrally installed with the solid net 276'. In particular, convenience of integrated manufacturing by a single injection operation may be achieved by the lower assembly part 270 integrally installed with the solid net 276' as is shown in FIG. 5.

In a manner similar to the first embodiment, the user may conveniently select any one of the lower assembly part 270 installed with the mesh net (not shown) and the lower assembly part 270 installed with the solid net 276'. For example, selection may be made convenient for a user by disassembling the upper assembly part 250 from the lower assembly part 270 and installing the lower assembly part 270 desired to be assembled on.

The common aspects of the first and second embodiments will be further described.

A plurality of connecting grooves 273 where a plurality of protrusions 253 may be inserted is positioned on the upper part of the lower assembly part 270.

It is preferable for the lower part of the plurality of connecting grooves 273 to be in a form of an L shape through being extended towards a rotating direction of the screw assembly 200. By being formed in an L shape, when being installed, the protrusions 253 first move along the connecting grooves 273 and then move sideways to form a firm connection. Further, the lower part must be extended in the rotating direction of the screw assembly 200 in order for the upper assembly part 250 and the lower assembly part 270 to be firmly connected even during the rotation of the screw assembly 200.

Referring to FIG. 6, the shape of the upper assembly part 250 and lower assembly part 270 will be described in detail.

The upper assembly part 250 includes a first portion A having a circular conical shape and a second portion B having an inverted circular cone. I.e., starting from the upper part going downwards, the diameter gradually increases and then decreases. The lower assembly part 270 is in the form of an inverted circular cone C and is continuously connected to the second portion B.

In other words, the overall shape of the screw assembly with the upper assembly part 250 and lower assembly part 270 connected together is comprised of an upper portion in the shape of a circular cone and a lower portion in the shape of an inverted circular cone, and the cut surface which distinguishes the upper assembly part 250 from the lower assembly part 270 is located at the lower part of the inverted circular conical shape (the dotted line across the cross-section of FIG. 6).

The reason for having such a structure is for a firm connection because the screw assembly 200 rotates in a state where the upper assembly part 250 and lower assembly part 270 is connected.

During the process where the object for extraction is crushed and squeezed by the interaction of the rotating screw assembly 200 with the drum 100, a load is applied to the screw assembly 200 in a downwards direction, and the applied load is least where the upper assembly part 250 and lower assembly part 270 are connected on the inverted circular conical shape part, thus further ensuring a firm connection between the upper assembly part 250 and lower assembly part 270.

3. Description of Juice Extracting Screw Assembly According to a Third Embodiment Referring to FIG. 7, the juicer 500 according to a third embodiment of the present invention will be described in detail. In reference to FIG. 2, only the screw assembly part differs.

Unlike the first and second embodiments, the screw assembly is not formed as a single body, but is formed in a manner where a mesh drum 280 is displaced separately in between the screw assembly 200 and drum 100, and it may further include a separately distinguished brush 290 as needed.

Unlike the first and second embodiments, in the case where a mesh net (not shown) is displaced on the mesh drum 280, the juice would pass the mesh net (not shown) and flow downwards along the outer surface of the mesh net (not shown) of the mesh drum 280 to be discharged, and the residue unable to pass the mesh net (not shown) would flow downwards between the screw assembly 200 and mesh drum 280 to be discharged.

I.e., in the first and second embodiment, unlike when the mesh net 276 is included and the juice is discharged radial on the inner side and the residue is discharged on the outer side, in the third embodiment where the mesh net (not shown) is included, the juice is discharged radial on the outer side and the residue is discharged radial on the inner side.

Such a mesh net (not shown) may be detachable from the mesh drum 280, or may also be manufactured integrally.

In the third embodiment, a solid net 286' may be displaced on the mesh drum 280. Thereby, both juice and residue cannot pass through the mesh drum 280 and flows downwards along the space between the screw assembly 200 and mesh drum 280 and is discharged together.

Such a solid net 286' may be detachable from the mesh drum 280, or may also be manufactured integrally.

4. Description of the Operation Process of Juicer 500

Hereinafter, operation of a juicer 500 according to an embodiment of the present invention will be described in detail with reference to FIG. 1 to FIG. 7.

After turning the switch 330 of the juicer 500 on and voltage is applied to the juicer 500, the rotating member inside the main body 300 is activated, thus rotating the angled shaft 310, and the rotating force is transferred to the rotating shaft 210 connected with the angled shaft 310.

As the screw assembly 200 rotates inside the drum 100 along with the rotation of the rotating shaft 210 to which it is connected, the operation of the juicer 500 is initiated.

When the juicer 500 is in operation, the object for juice extraction is injected through the feed hole 11 formed on the aforementioned lid 10 using a pusher 12, and the injected object for juice extraction arrives at the screw assembly 200 whereby it is crushed and squeezed.

The 'first mode' wherein the mesh net 276 is installed will be described. This is the general case where the user prefers the juice and residue to be separated from each other. In the first embodiment, the mesh net 276 is installed to the lower body 275, and in the second embodiment, the mesh net(not shown) is manufactured with it installed to the lower assembly part 270 integrally, and in the third embodiment, the mesh net(not shown) is installed to the mesh drum 280.

The object for extracting juice that was inserted through the feed hole 11 is separated into juice and residue by the screw assembly 200, but the juice and residue both flow downwards along the outer surface of the screw assembly 200.

In the first and second embodiments, once the object for juice extraction arrives at the mesh net 276, it passes through the mesh net 276 and by flowing downwards in the inner side of the screw assembly 200, it passes through the second guide groove 112, juice discharge hole 130, and juice flow vessel 131 sequentially to be discharged.

When the residue arrives at the mesh net 276, because it cannot pass through the holes of the mesh net 276, by flowing downwards on the outer side of the screw assembly 200, it passes through the first guide groove 111, residue discharge hole 120, and residue flow vessel 121 sequentially to be discharged.

Therefore, the juice and residue can be discharged separately following a process such as the one mentioned above.

The 'second mode' wherein the solid mesh 276' is installed will be described. Unlike how it is with the general juicer, this is the case where the user needs the juice and residue together. Making smoothies, milkshakes, chopping garlic and so on can be considered to be such cases. In the first embodiment, the solid mesh 276' is installed to the lower body 275, and in the second embodiment, the solid net 276' is manufactured with it installed to the lower assembly part 270 integrally and in the third embodiment, the solid net 276' is installed to the mesh drum 280.

In the same manner as the first mode, the object for extracting juice that was inserted through the feed hole 11 is separated into juice and residue by the screw assembly 200, and the juice and residue both flow downwards along the outer surface of the screw assembly 200.

In the first and second embodiments, because both the juice and residue cannot pass through the solid net 276', by flowing downwards on the outer side of the screw assembly 200, it passes through the first guide groove 111, residue discharge hole 120, and residue flow vessel 121 sequentially to be discharged.

In another embodiment, by altering the shape of the flow vessel at the lower end of the screw assembly 200, the object for juice extraction may pass through the second guide groove 112, juice discharge hole 130, and juice flow vessel 131 sequentially to be discharged together.

Further, in another embodiment, the juice and residue may be discharged through a separated discharge flow vessel (not shown) formed additionally for the purpose.

In the third embodiment, because both the juice and residue cannot pass through the solid mesh 286' of the mesh drum 280, they are discharged together by flowing downwards in between the screw assembly 200 and mesh drum 280.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Furthermore, these modifications, additions and substitutions should be regarded as falling within the bounds of the present invention.

The invention claimed is:

1. A juice extracting screw assembly, comprising:
a hollow drum; and
a screw assembly disposed inside the hollow drum, wherein the screw assembly comprises:
an upper assembly part in which an extracting blade is formed;
a lower assembly part being detachably assembled on the upper part of the juice extracting screw assembly;
a plurality of protrusions are provided on a lower part of the upper assembly part,
a plurality of connecting grooves to be joined with the plurality of protrusions by insertion are provided in an upper part of the lower assembly part, and
a lower part of the plurality of connecting grooves is provided in an L shape through being extended towards a rotating direction of the screw assembly.

2. The juice extracting screw assembly as set forth in claim 1, wherein a juice extracting rib is provided on an outer surface of the lower assembly part and,
the juice extracting blade and the juice extracting rib are connected in series.

3. The juice extracting screw assembly as set forth in claim 2 wherein, in use, an object for juice extraction is fed to the juice extracting screw assembly, the object for juice extraction is separated into an extracted juice and a residue by rotation of the screw assembly, and flows downwards along the juice extracting blade and the juice extracting rib that are consecutively connected.

4. The juice extracting screw assembly as set forth in claim 1, wherein the lower assembly part comprises a lower body having a plurality of openings, and a mesh net is detachably attached to the lower body.

5. The juice extracting screw assembly as set forth in claim 1, wherein the lower assembly part comprises a lower body having a plurality of openings, and solid net is detachably attached to the lower body.

6. The juice extracting screw assembly as set forth in claim 1, wherein a mesh net is disposed in the lower assembly part, an d the lower assembly part and the mesh net are integrally manufactured.

7. The juice extracting screw assembly as set forth in claim 1, wherein a solid net is disposed in the lower assembly part, and the lower assembly part and the solid net are integrally manufactured.

8. The juice extracting screw assembly as set forth in claim 4 wherein, in use, an object for juice extraction is fed to the juice extracting screw assembly with the mesh net being provided, the object for juice extraction is separated into an extracted juice and a residue by rotation of the screw assembly, and the juice passes through the mesh net to flow inwardly to the screw assembly while the residue fails to pass through the mesh net and flows outwardly to the screw assembly.

9. The juice extracting screw assembly as set forth in claim 5 wherein, in use, an object for juice extraction is fed to the juice extracting screw assembly with the solid net being provided, the object for juice extraction is separated into an extracted juice and a residue by rotation of the screw assembly, and the juice and the residue fail to pass through the solid net and flow outwardly to the screw assembly.

10. The juice extracting screw assembly as set forth in claim 1, wherein the upper assembly part comprises:
a first portion A having a circular conical shape and a second portion B having an inverted circular conical shape.

11. The juice extracting screw assembly as set forth in claim 10, wherein the lower assembly part is an inverted circular cone and is connected in series, thereby continuing from the second portion B.

12. A juicer, comprising:
a juice extracting screw assembly as set forth in claim 1;
a main body provided with a rotary member to provide a rotating force to the screw assembly; and
a lid to close the hollow drum at the upper part therein, to which an object for juice extraction is to be fed.

\* \* \* \* \*